(12) United States Patent
Furihata

(10) Patent No.: US 7,355,763 B2
(45) Date of Patent: Apr. 8, 2008

(54) IMAGE SCANNING APPARATUS, METHOD AND BUSINESS MACHINE USING THE SAME

(75) Inventor: Hideki Furihata, Okaya (JP)

(73) Assignee: Seiko Epson Corporation (JP)

( * ) Notice: Subject to any disclaimer, the term of this patent is extended or adjusted under 35 U.S.C. 154(b) by 1011 days.

(21) Appl. No.: 10/770,038

(22) Filed: Feb. 2, 2004

(65) Prior Publication Data

US 2004/0218230 A1 Nov. 4, 2004

(30) Foreign Application Priority Data

Mar. 7, 2003 (JP) .............................. 2003-062069
Oct. 21, 2003 (JP) .............................. 2003-360747

(51) Int. Cl.
*H04N 1/04* (2006.01)

(52) U.S. Cl. .................. 358/474; 358/498; 358/497; 399/17; 399/45; 271/273; 271/274; 347/101; 347/153

(58) Field of Classification Search ................ 358/474, 358/498, 497, 496; 399/17, 45, 111, 100, 399/107; 271/274, 273; 355/271, 273; 347/101, 347/153

See application file for complete search history.

(56) References Cited

U.S. PATENT DOCUMENTS

| | | | | |
|---|---|---|---|---|
| 5,463,256 A | * | 10/1995 | Wang et al. | ................. 271/274 |
| 6,178,012 B1 | * | 1/2001 | Larkin et al. | ............... 358/474 |
| 2002/0041402 A1 | * | 4/2002 | Hatano | ....................... 358/498 |
| 2005/0012969 A1 | * | 1/2005 | Matsuyama et al. | ........ 358/498 |

FOREIGN PATENT DOCUMENTS

| | | |
|---|---|---|
| JP | 06-121132 | 4/1994 |
| JP | 2000-198552 | 7/2000 |

* cited by examiner

*Primary Examiner*—Douglas Q. Tran
*Assistant Examiner*—Negussie Worku
(74) *Attorney, Agent, or Firm*—Anderson Kill & Olick, PC

(57) ABSTRACT

Scanning errors and document feed errors are prevented by pressing originals, including thin originals and thick originals of greatly different thicknesses, to the scanning surface (1a) of an image sensor (1) with pressure appropriate for the respective original. A pressure-generating mechanism (50) is used to press the original against the scanning surface (1a) by selecting different elastic bodies with different spring forces to produce a different elastic force in accordance with the thickness of the original document.

14 Claims, 14 Drawing Sheets

IMAGE SCANNING APPARATUS, METHOD AND BUSINESS MACHINE USING THE SAME

FIELD OF INVENTION

The present invention relates to an image scanning apparatus and method using a contact image sensor for reading image information from a document and to a business machine using the image scanning apparatus.

BACKGROUND

Image scanning apparatus using a contact image sensor, hereinafter simply referred to as a "scanner", is commonly used today to electronically capture images from printed documents by scanning the document while the document is held in contact with the scanning surface of the sensor. The scanning surface is typically a glass plate. To capture images from the document with high precision requires pressing the document against the glass plate with appropriate force.

Conventional scanners, which have a contact image sensor, typically transport the document over the scanning surface using, for example a spring to press the document against the scanning surface. In some scanners the pressure which pushes the document against the scanning surface, is adjustable as taught, for example, in JP-A-6-211132, FIG. 1, paragraphs [0016] to [0018]).

FIG. 15 illustrates a conventional pressure generating mechanism for the scanner taught in JP-A-6-211132 having a platen roller 102, which is controllably mounted so as to press a document against the scanning surface of the sensor 101. By turning a pressure adjustment gear set 105, the pressure control lever 104 pivots on a stationary shaft at the left distal end of the lever 104 which, in turn, adjusts the degree of compression of the pressure control spring 103 corresponding to the manual adjustment of the gear set 105. The sensor 101 is positioned in a horizontal plane in FIG. 15 and can move only in the vertical direction.

The pressing force F in FIG. 15 between the sensor and document when disposed between the platen roller and scanning surface of the sensor can be calculated from the following equation $$F = kx - mg$$

where k is the spring constant, x is spring compression, m is the self-weight of the sensor, and g is the acceleration of gravity. As this equation shows, force F can be adjusted as desired by turning the pressure adjustment gear 105, thereby changing the compression x of the pressure control spring 103.

The configuration as shown in FIG. 15 makes it easy to manually adjust the force F with little required torque because of the worm gear used in the pressure adjustment gear set 105. Furthermore, once the pressure is adjusted and set as desired, the pressure adjustment gear set 105 reliably holds the setting. Additional means for holding the pressure setting is therefore unnecessary.

Document-feeding type scanners using a conventional contact image sensor are designed to transport and scan documents having a thickness in a specific range. As a result, when particularly thick documents, which exceed this thickness range need to be scanned such as a driver's license and card stock (referred to below as "thick originals"), the pressure on the thick original may be insufficient to press it against the platen and have little resistance to the tendency of the document to bend. Accordingly, thick originals are not held against the scanning surface of the sensor with sufficient force to prevent scanning errors from occurring.

On the other hand, if the pressure is set for thick originals and a document which is thinner than the set thickness range (a "thin original") is then scanned, the excessive pressure could wrinkle the original and cause document feed errors, e.g. paper jams.

Furthermore, the surface of the original can be easily marred if the original is thin and heat-sensitive or is a pressure-sensitive paper. In such cases it is not desirable to apply more pressure than needed.

Moreover, the paper feed load may change at the moment the roller pair grabs the edge of a thick original and at the moment the rollers release the edge. This will disturb the paper feed pitch and can adversely affect image scanning. This fluctuation in the feed load can be reduced by using larger rollers, but this increases the size of the drive device.

The conventional scanner as taught in JP-A-6-211132 addresses some of the above problems by providing a manually adjustable means using the pressure adjustment gear to change the compression setting (initial compression) of the pressure control spring 103 which, in turn, varies the force F according to the thickness of the original document.

The conventional scanner shown in FIG. 15, however, adjusts the force on the original and platen using the pressure generating mechanism by changing the compression of only one spring 103, and can therefore only use one spring constant to set the applied pressure. The problem with this scanner, therefore, is that the range in which the applied pressure can be adjusted is necessarily limited, and thin originals and thick originals of greatly different thickness cannot be pressed against the sensor with pressure appropriate for the specific original.

Pressure adjustment in the conventional pressure generating mechanism shown in FIG. 15 requires the operator to manually manipulate a pressure adjustment gear to adjust the pressure each time the thickness of the original changes. Thus setting the pressure correctly is complicated.

SUMMARY OF THE INVENTION

The scanner of the present invention solves the aforementioned problems for both thick originals and thin originals of greatly different thicknesses. The scanner permits the original, independent of thickness, to be pressed with a respective and appropriate force against the scanning surface of a sensor, thereby preventing scanning errors and document feed errors. The present invention is also a business machine that uses this scanner.

The scanner according to the present invention has an image sensor for reading image information from a document held in contact with the sensor and a pressure-generating mechanism having multiple elastic bodies for pressing the document to the sensor with an elastic force which differs depending on the thickness of the document. The pressure-generating mechanism presses a document whose thickness is within a first range using a first one of these multiple elastic bodies and presses a document whose thickness is within a second range using a second elastic body. The second range of thicknesses is contiguous to and greater than the first range. The first range may range from zero to a certain first limit value, and the second range may cover all thicknesses above this first limit value up to the maximum thickness that the scanner can handle. Alternatively, the second range may cover all thicknesses above the first limit value up to a second limit value, and a third elastic body may be provided to press documents whose thickness exceeds the second limit value and so forth.

The scanner of this invention can press both thick originals and thin originals of greatly different thickness against the sensor with force appropriate for the original, thereby preventing reading (scanning) errors as well as document feed errors.

BRIEF DESCRIPTION OF THE DRAWINGS

Other objects and attainments together with a fuller understanding of the invention will become apparent and appreciated by referring to the following description of preferred embodiments taken in conjunction with the accompanying drawings, in which.

DESCRIPTION OF THE INVENTION

The scanner of the present invention employs a pressure-generating mechanism 50 which is hereafter described in detail with reference to FIG. 1(a) showing the major parts of the pressure-generating mechanism 50 when scanning a thin original, and FIG. 1(b) showing major parts of the pressure-generating mechanism 50 when scanning a thick original.

Figure 1:
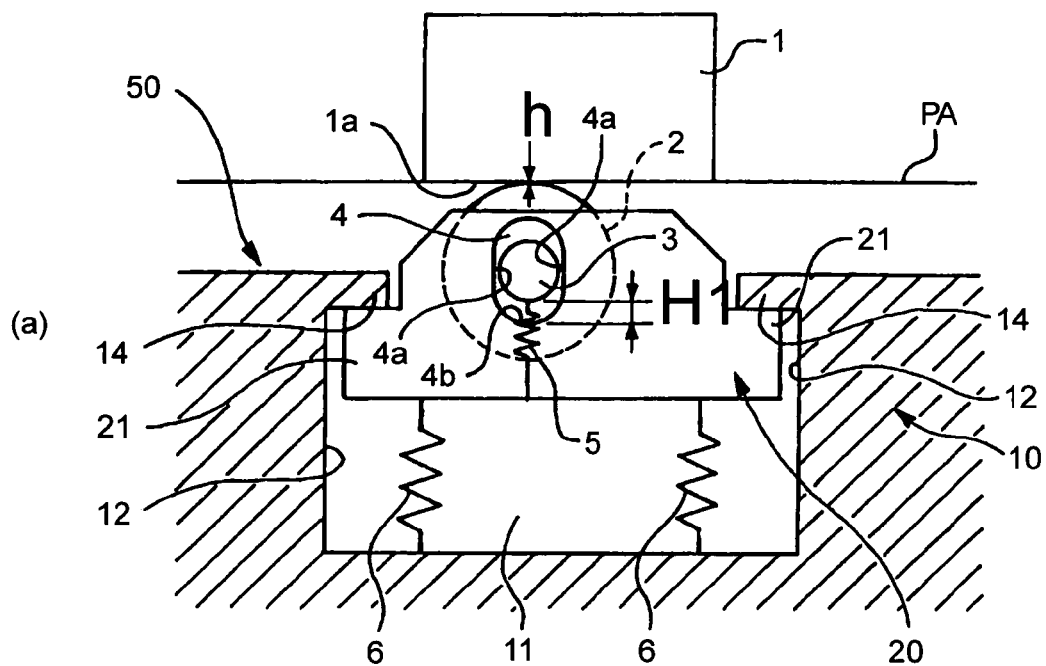
FIG. 1(a-b) illustrate the principle of a pressure-generating mechanism for a scanner according to the present invention with FIG. 1(a) being a schematic drawing of the pressure-generating mechanism when scanning a thin original, and FIG. 1(b) being a schematic drawing of the pressure-generating mechanism when scanning a thick original.
Figure 1:
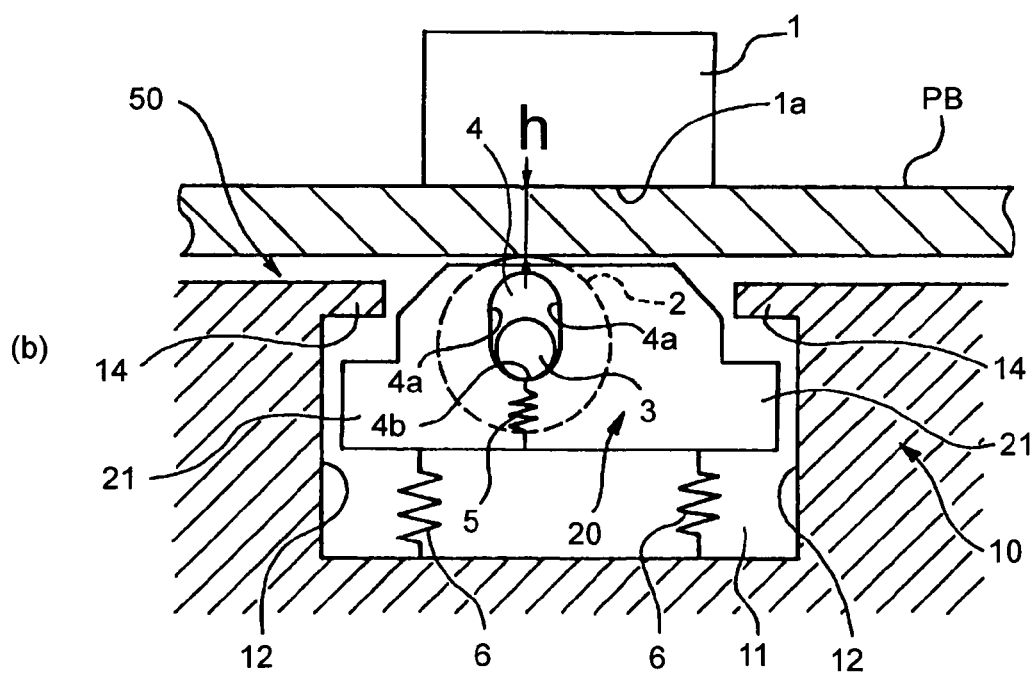

The scanner of the present invention as shown in FIGS. 1(a-b) includes a contact image sensor 1 representing an image scanning sensor having a scanning surface 1a typically made of glass. A thin original PA or thick original PB is pressed against the scanning surface 1a by the pressure-generating mechanism 50, which is shown disposed opposite the image sensor 1. Image information from the thin original PA or thick original PB is read by the sensor 1 while the document is pressed by the pressure-generating mechanism 50 against the scanning surface 1a.

The pressure-generating mechanism 50 presses the thin original PA in FIG. 1(a) and the thick original PB in FIG. 1(b) against the scanning surface 1a applying different forces. In each Figure, the pressure-generating mechanism 50 has a pressure member 2, a movable guide 20, a fixed guide 10, a first elastic body 5, and a second elastic body 6.

The pressure member 2 for each FIG. 1(a) and FIG. 1(b) is disposed opposite the sensor 1 so as to press the thin original PA and thick original PB against the scanning surface 1a in each Figure respectively. The pressure member 2 has a shaft 3 and rotates on this shaft 3. The pressure member 2 can thus easily transport the thin original PA or the thick original PB substantially parallel to the scanning surface 1a while also pressing the document against the scanning surface 1a.

The shaft 3 of pressure member 2 is supported movably in the document thickness direction (that is, the direction in which pressure is applied to the document) by the movable guide 20. The movable guide 20 has an elongated mounting hole 4 of elliptical geometry with a long axis in the document thickness direction. The shaft 3 is supported within the mounting hole 4 so that it can slide relative to the movable guide 20 guided by the side walls 4a of the mounting hole 4. These side walls 4a are parallel to the document thickness direction.

The first elastic body 5 is disposed between the movable guide 20 and the shaft 3 of pressure member 2. The first elastic body 5 urges the pressure member 2, relative to the movable guide 20, towards the scanning surface 1a of sensor 1 and thereby presses thin original PA or thick original PB against the scanning surface 1a via the pressure member 2.

The maximum deformation (deflection) of the first elastic body 5 is limited and is reached when the shaft 3 abuts against one end of the mounting hole 4 in the document thickness direction, more specifically, against the bottom end 4b as seen in FIG. 1.

This bottom end 4b therefore functions as a stopper limiting the movement of the shaft 3 relative to the movable guide 20. If the pressure member 2 moves, according to the document thickness, relative to the movable guide 20 by a distance greater than specified stroke H1 from the position at which the pressure member 2 touches the sensor 1, the shaft 3 contacts bottom end 4b. The first elastic body 5 will not deform (deflect) further beyond the point at which the shaft 3 touches the bottom end 4b. The load applied by first elastic body 5 to the shaft 3 is therefore greatest when the shaft 3 contacts the bottom end 4b.

The movable guide 20 is movably supported relative to the fixed guide 10 in the document thickness direction. More specifically, there is a recess 11 in the fixed guide 10, and the bottom part of the movable guide 20 is housed in this recess 11.

A guide member 21 is disposed at both the front side and the back side of the movable guide 20 (right and left sides as seen in FIG. 1). The guide members 21 are supported so that they can slide on both side walls 12 of the recess 11 in fixed guide 10. The movable guide 20 is therefore permitted to slide in the document thickness direction (that is, up and down as seen in FIG. 1) along side walls 12, and is positioned in the horizontal direction (right to left as seen in FIG. 1) by contact between the guide members 21 and side walls 12.

A plural number of second elastic bodies 6 having a combined spring constant greater than that of the first elastic body 5 are disposed in a recess 11 of the fixed guide 10 between the movable guide 20 and the bottom of the recess 11. These second elastic bodies 6 apply pressure to the movable guide 20 from the bottom of the recess 11 in fixed guide 10.

A ridge 14 protruding inward (toward the open center of the recess 11) from the outside rim of the recess 11 is formed to the recess 11 in fixed guide 10. When the movable guide 20 is pushed by the second elastic bodies 6 in the direction applying pressure on the original, the ridge 14 contacts the guide member 21 of movable guide 20 and thus holds the movable guide 20 in a predefined position.

The operation of the first elastic body 5 and the second elastic bodies 6 will now be described.

As noted above, a first spring constant, that is, the spring constant of the first elastic body 5, is set sufficiently smaller than the second spring constant, that is, the spring constant of the second combined elastic bodies 6 so that there is no latent deflection of the second elastic bodies 6 when the shaft 3 moves relative to movable guide 20 within the allowed range of stroke H1.

More specifically, the elastic force produced by the second elastic bodies 6 push the guide member 21 of movable guide 20 against ridge 14 until the shaft 3 descends and contacts the bottom end 4b of mounting hole 4. Therefore, a thin original PA is pressed to the scanning surface 1a by the elastic force of first elastic body 5 as long as the shaft 3 does not contact bottom end 4b, and with the second elastic bodies 6 exerting no force on the thin original PA (see FIG. 1), i.e., as long as the thickness of the scanned document is within a first thickness range of from zero to H1.

However, when a relatively thick original is inserted shaft 3 is forced against the bottom end 4b of mounting hole 4 in movable guide 20. The shaft 3 pushes down the movable guide 20 which compresses (deflects) the second elastic bodies 6. The thick original is thus pushed by the elastic force of the second elastic bodies 6 as a result of the second elastic bodies 6 being compressed. A thick original in this sense is an original whose thickness exceeds the first thickness range as defined above.

Thus, the thickness of the inserted original determines whether the force from the first elastic body 5 or the force from the second elastic bodies 6 will operate to press the original against the scanning surface 1a. More specifically, the elastic force from the first elastic body 5 is applied when the range of movement of the pressure member 2 as allowed by the mounting hole 4 controls, that is, until shaft 3 abuts against the bottom end 4b of hole 4, and thereafter the elastic force from the second elastic bodies 6 take over and is applied when the shaft 3 has met the bottom end 4b and the second elastic bodies 6 are in compression.

Accordingly, the pressure applied against the inserted original will change according to whether the elastic force from the first elastic body 5 is being applied, that is, within the length of stroke H1 or whether the elastic force from the second elastic bodies 6 is being applied.

Therefore, as shown in FIG. 1(a), when the gap h between scanning surface 1a and pressure member 2 is formed by a thin original PA (where h<=H1), only the elastic force exerted by first elastic body 5 works to press the thin original PA to the scanning surface 1a because gap h is less than or equal to the allowable stroke H1. Elastic force from the second elastic bodies 6 works only to hold the movable guide 20 against ridge 14 of fixed guide 10, and the elastic force of second elastic bodies 6 does not work as force urging the pressure member 2.

However, when a thick original PB is inserted as shown in FIG. 1(b) and the gap h between scanning surface 1a and pressure member 2 becomes greater than the allowable stroke H1, that is, H1<h, the first elastic body 5 is greatly deflected such that shaft 3 contacts bottom end 4b, and guide member 21 of movable guide 20 separates from the ridge 14 of the fixed guide 10.

In this case the force of pressure member 2 pushing the thick original PB against the scanning surface 1a of sensor 1 is only the elastic force of the second elastic body 6.

The pressure-generating mechanism 50 of this invention thus uses the difference in the thickness of a thin original PA and a thick original PB and mechanically detects this difference to automatically select first elastic body 5 or second elastic bodies 6 and thereby change the applied pressure.

First Embodiment

Figure 2:
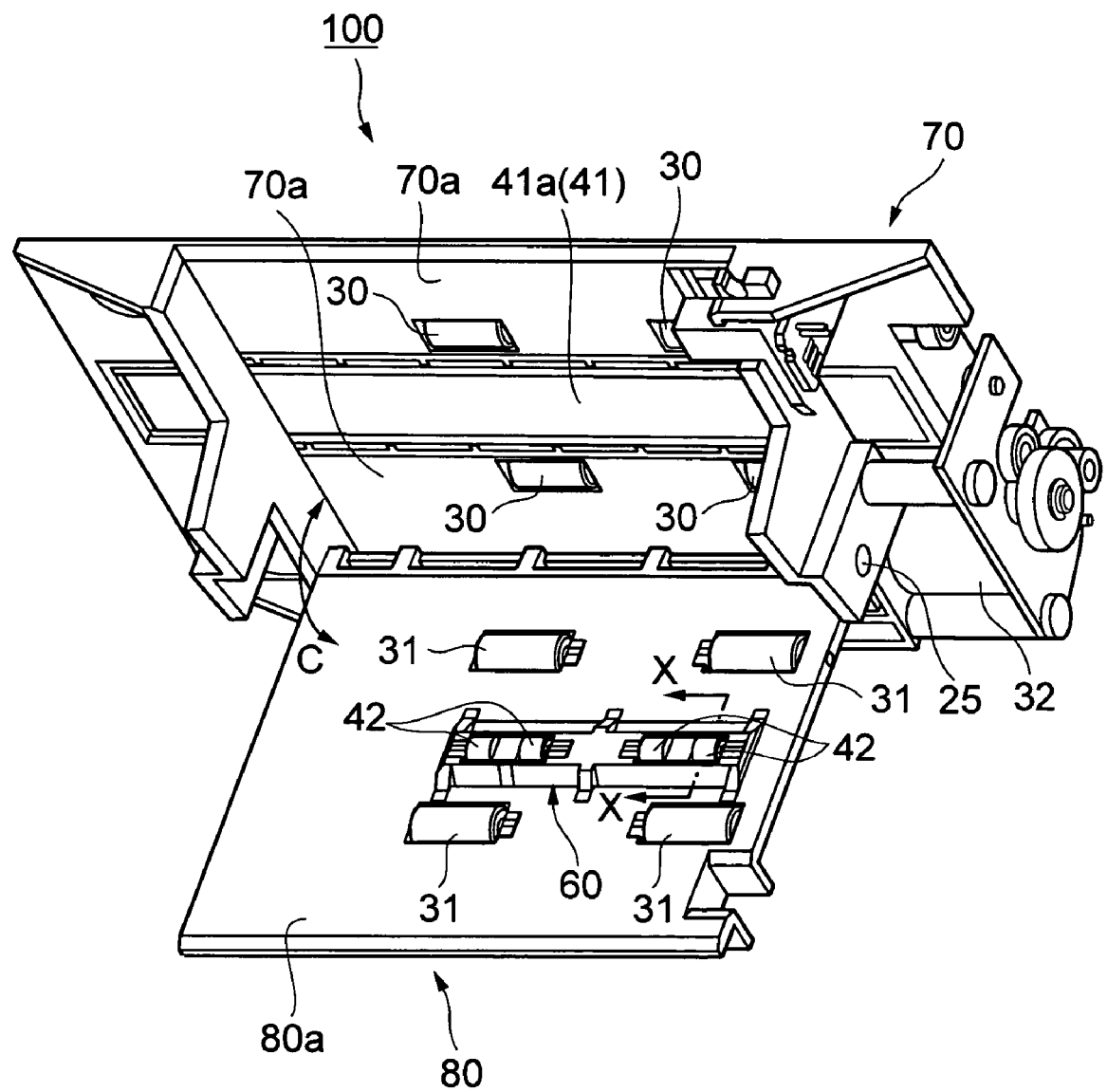
FIG. 2 is an perspective view showing a first embodiment of a scanner according to the present invention when the paper guide cover (fixed guide) is open.
Figure 3:
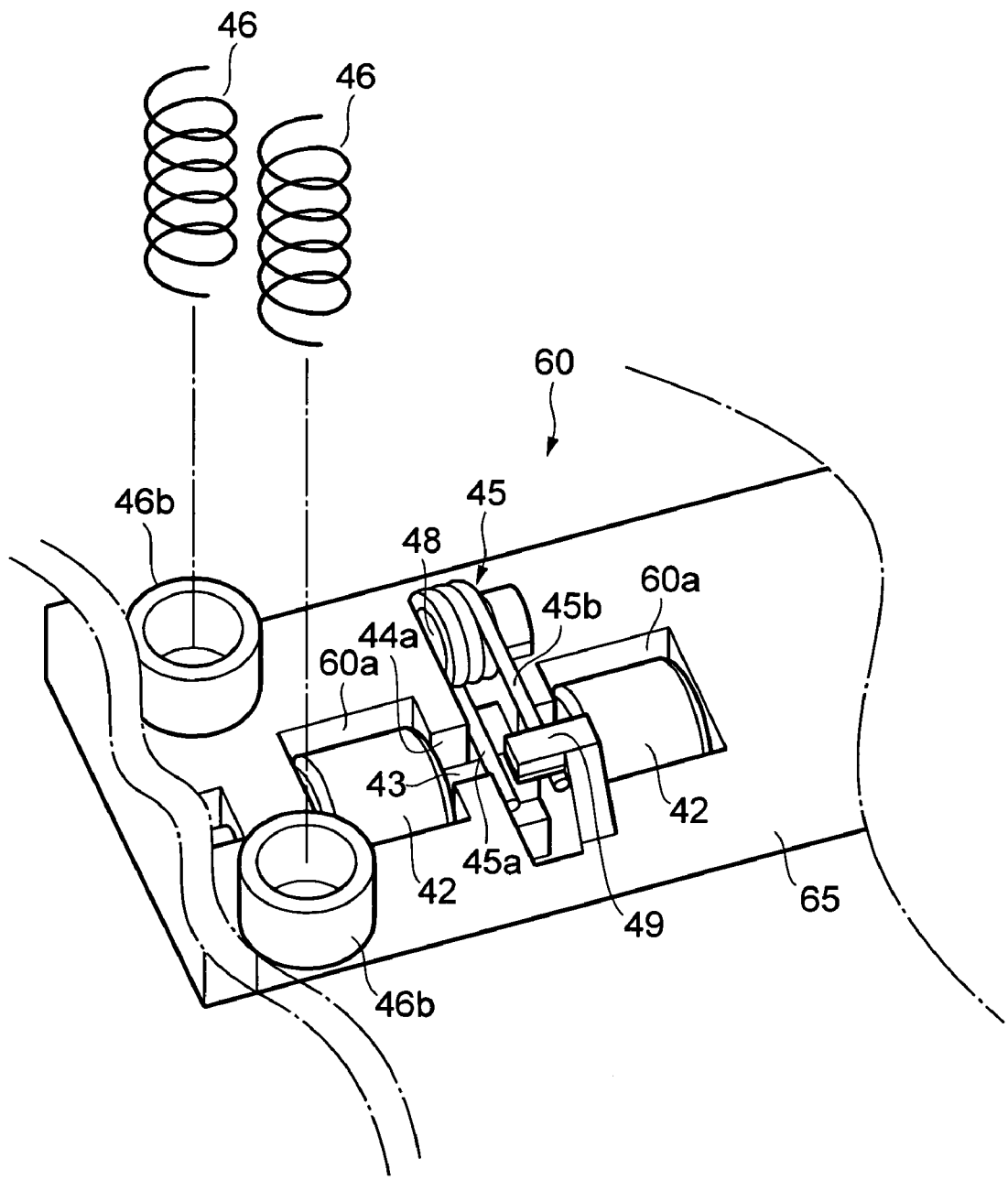
FIG. 3 is a perspective lateral view of major parts in FIG. 2.
Figure 4:
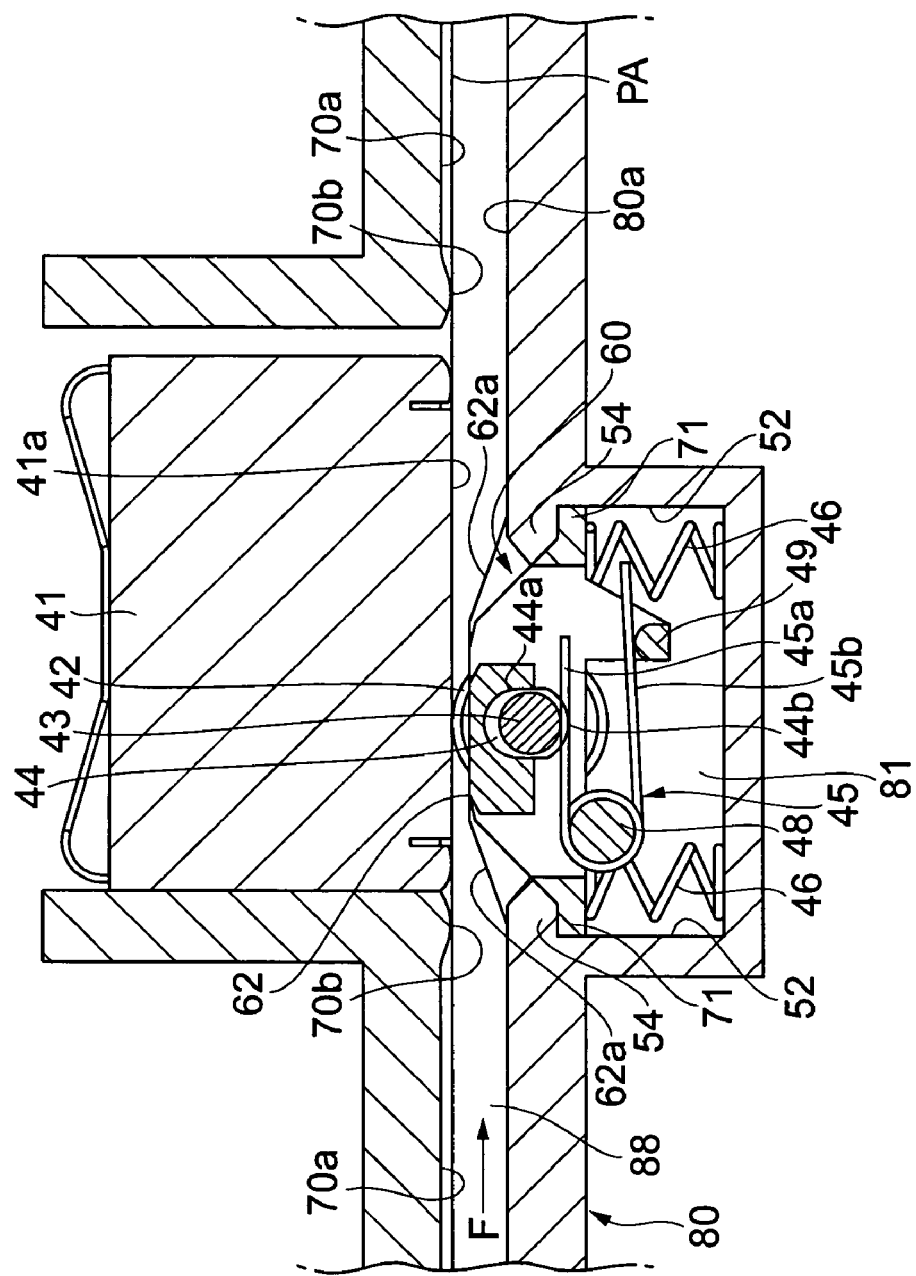
FIG. 4 is a sectional view of the pressure-generating mechanism along line X-X in FIG. 2 when scanning a thin origin.
Figure 5:
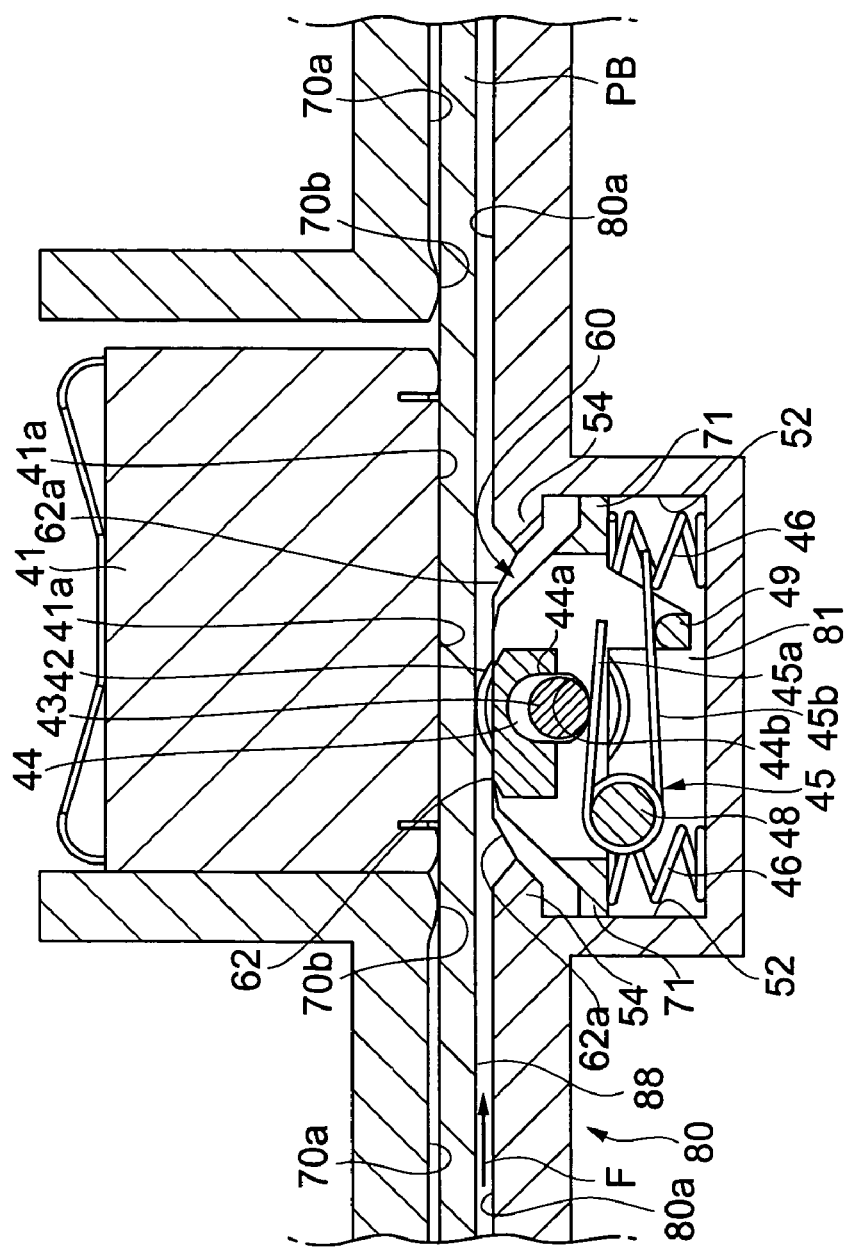
FIG. 5 is a sectional view of the pressure-generating mechanism along line X-X in FIG. 2 when scanning a thick original.

FIG. 2 to FIG. 5 illustrate a more specific application of the above-described pressure-generating mechanism 50. FIG. 2 is a perspective view of the first embodiment of a scanner and FIG. 3 is a partial perspective view of the main parts of this scanner. FIG. 4 and FIG. 5 are sectional views of the scanner through line X-X in FIG. 2. FIG. 4 is a sectional view when a thin original is inserted, and FIG. 5 is a sectional view when scanning a thick original.

The scanner 100 shown in FIG. 2 is mounted to a main frame 70 comprising a drive system by means of a hinge 25 enabling a paper guide cover 80 (corresponding to the fixed guide 10 in FIG. 1) to freely open and close in the direction indicated by arrow C in FIG. 2.

Mounted to the main frame 70 is a motor 32, four paper feed drive rollers 30 that are linked to and driven by the motor 32, and a contact image sensor 41.

The contact image sensor 41 is disposed between the drive rollers 30. As shown in FIG. 4, the scanning surface 41a of the sensor 41 is fixed at a position projecting slightly forward from the first wall surface 70a of document feed path 88. A protrusion 70b projects from the first wall surface 70a and lies substantially at the same height as the scanning surface 41a of sensor 41.

The drive rollers 30 are also positioned so that their peripheral surfaces project slightly above first wall surface 70a.

Driven rollers 31 are disposed opposite the four drive rollers 30 to hold the original between the driven rollers 31 and drive rollers 30. The peripheral surfaces of these driven rollers 31 project slightly above the second wall surface 80a of the document feed path 88.

Pressure rollers 42 are driven rollers following movement of the original and are disposed between the driven rollers 31. These pressure rollers 42 are disposed so that their peripheral surface projects slightly from the top end 62 of the movable guide 60.

There are two pressure rollers 42 each supported by a respective one of two shafts 42. Each pressure roller 42 is in fact composed of a pair of rollers with a gap between the peripheral surfaces of the two rollers. The pressure rollers 42 are disposed to the movable guide 60 with the shafts 43 of the rollers coaxially aligned.

When the paper guide cover 80 of this scanner 100 is locked in the closed position, document feed path 88 is formed with the second wall surface 80a of paper guide cover 80 and the first wall surface 70a of main frame 70 being mutually opposed surfaces separated by a distance which forms a specific gap therebetween. The drive rollers 30 protruding from first wall surface 70a are also mutually opposed to driven rollers 31 protruding from second wall surface 80a on opposite sides of this document feed path 88. In addition, scanning surface 41a of sensor 41 protruding from first wall surface 70a opposes pressure rollers 42 protruding from second wall surface 80a.

The construction of movable guide 60 and the surrounding parts is described in detail herewith with reference to FIG. 3, FIG. 4, and FIG. 5. Note that FIG. 3 is a perspective view from the back side of the movable guide 60 (i.e., the side facing away from the document feed path 88).

As noted above, the movable guide 60 has two pressure rollers 42. Each of the pressure rollers 42 is rotatably supported in a matching opening 60a formed in the movable guide body 65, and the shaft 43 of each pressure roller 42 is urged toward the sensor 41 by a first spring 45. This first spring 45 is a coil-shaped torsion spring supported by a support shaft 48 disposed to the movable guide body 65 and passing through the coil. The working arm 45a of the spring contacts shaft 43, and the other arm 45b engages a spring holder 49 projecting upward (the direction away from the direction in which the working arm 45a urges the rollers) from the movable guide body 65.

The working arm 45a urges the axial middle of the shaft 43 of the pressure rollers 42 upwardly. The ends of the shaft 43 protruding from the ends of the pressure rollers 42 are held in elongated shaft support holes 44, respectively, formed in the movable guide body 65. The shaft 43 is positioned by the side walls 44a of the shaft support hole 44 so that it has virtually no play from side to side (the document feeding direction), but is allowed to move within the length of the hole 44 in the vertical direction (the direction perpendicular to the document feeding direction). The pressure rollers 42 are thus supported so that they can move in the document thickness direction (i.e., perpendicular to the document feeding direction).

The movable guide 60 is configured so that it can move in the direction perpendicular to the document feeding direction. More specifically, part of the movable guide 60 is housed in a recess 81 in the paper guide cover 80, and second springs 46, which are compression springs, urge the movable guide 60 toward the sensor 41, i.e., the direction in which the movable guide 60 is intended to move. The lower ends of these second springs 46 are held in tubular spring holders 46b, for example, disposed at the four corners of the movable guide 60.

A shoulder 71 projects from the front and back (right and left sides as seen in FIG. 4 and FIG. 5) of the movable guide 60. By contacting the side walls 52 of the recess 81, these shoulders 71 precisely position the movable guide 60 and enable the movable guide 60 to slide up and down.

Stops 54 disposed to recess 81 of paper guide cover 80 limit the motion range of movable guide 60 in the direction perpendicular to the document feeding direction, i.e., the direction in which the movable guide 60 is urged by the second springs 46. The movable guide 60 is held in a predefined position when the shoulders 71 contact the stops 54.

The operation of the scanner 100 according to this first embodiment of the invention when scanning a thin original PA and a thick original PB is hereafter described.

When the scanner 100 scans a thin original PA ranging in thickness from copy paper (approximately 0.08 mm thick) to Kent paper (approximately 0.18 mm thick) will be described first with reference to FIG. 4.

When the paper guide cover 80 of scanner 100 is closed, the scanning surface 41a of sensor 41 and the peripheral surface of the pressure rollers 42 are in direct contact. The pressure rollers 42 are urged toward the scanning surface 41a by the elastic force produced by the first spring 45 at this time.

When a thin original PA is inserted into the document feed path 88 in this state, the thin original PA is grasped by the drive rollers 30 and driven rollers 31 and fed in the direction of arrow F in contact with or proximally to the top side (first wall surface 70a) of the document feed path 88. The thin original PA is then transported sliding along the scanning surface 41a so as to enter in between the scanning surface 41a and the pressure rollers 42 (with the pressure rollers 42 moving away from the scanning surface 41a within the allowed stroke H1) and is scanned by the sensor 41. As shown in FIG. 4, a gap h is created between the pressure rollers 42 and the scanning surface 41a, which is a relatively small gap and is dependent on the thickness of the thin original PA.

If the allowed stroke H1 is 0.3 mm, for example, and the relationship between gap h and allowed stroke H1 is (0<=h<H1) as described above, then when scanning a thin original PA approximately 0.08 mm thick, the thin original PA is urged to the scanning surface 41a with a relatively weak force suitable for the thin original PA. The weak force is applied by the first spring 45, having a low spring constant.

The deflection of the first spring 45 at this time produces elastic force corresponding to the deflection, and the thin original PA is pressed against the scanning surface 41a of sensor 41 by an appropriate weak elastic force that will not cause a paper jam, for example.

The second springs 46 push the movable guide 60 against the stops 54 at this time. Because the elastic force of the second springs 46 is stronger than the elastic force of the first spring 45 as noted above, inserting a thin original PA does not cause the second springs 46 to deflect. As a result, the thin original PA is pressed to the sensor 41 only by the weak elastic force produced by deflection of the first spring 45.

When a thick original PB such as a credit card ranging in thickness from approximately 0.6 mm to 1.2 mm is inserted into scanner 100 is hereafter described with reference to FIG. 5.

When the scanner 100 is in the standby state with the paper guide cover 80 closed, the scanning surface 41a of sensor 41 and the peripheral surface of pressure rollers 42 are touching each other as shown in FIG. 4, and the pressure rollers 42 are pressed to the scanning surface 41a by the elastic force of the first spring 45.

When a thick original PB is then inserted into the document feed path 88 in this standby state in the direction of arrow F as shown in FIG. 5, the thick original PB is grabbed by the drive rollers 30 and driven rollers 31 and advanced in contact with or proximally to the first wall surface 70a (top side in the figure) of the document feed path 88 in the same way as the thin original PA described above.

When the leading edge in the insertion direction of the thick original PB then contacts the tapered surface 62a of the top end 62 of the movable guide 60, the thick original PB moves the movable guide 60 down and is guided into the space between scanning surface 41a and pressure rollers 42. It should be noted that there are cases in which the leading edge of the thick original PB does not contact the tapered surface 62a.

In this case the gap h between the scanning surface 41a and the pressure rollers 42 is a larger gap with a space based upon the thickness of the thick original PB to a distance of 0.6 mm or more, i.e., greater than the predetermined allowed stroke H1 of the shaft 43. As a result, H1<h.

In this case the shaft 43 contacts the bottom end 44b of the shaft support hole 44 in movable guide 60 and thus pushes the movable guide 60 downward into the recess 81. The movable guide 60 thus retracts into the recess 81 from contact with the stops 54, and the second springs 46 therefore begin to be compressed.

The thick original PB is then advanced sliding across the scanning surface 41a at an appropriate speed and is scanned by the sensor 41 with the pressure rollers 42 retracted a distance exceeding the allowed stroke H1 from the scanning surface 41a.

When scanning a thick original PB, the second springs 46 are deflected by an amount determined by the movement of movable guide 60 relative to the paper guide cover 80, and a stronger elastic force is produced by the second springs 46, which pushes the thick original PB against the sensor 41 via the movable guide 60 and shaft 43. This makes it possible to hold a relatively rigid thick original PB tight to the scanning surface 41a while limiting bending of the original, thereby assuring accurate scanning.

Depending on the thickness of the original to be scanned, the force pressing the original changes greatly from a first force produced by the first spring 45 to a second force produced by the combined second springs 46, i.e., the force changes discontinuously in the scanner 100 according to this first embodiment of the invention. More specifically, the pressure produced by the first spring 45 is applied to the original when the thickness of the original (gap h) is within the allowed stroke H1, and the pressure produced by the second springs 46 is applied when the original thickness exceeds allowed stroke H1.

Figure 6:
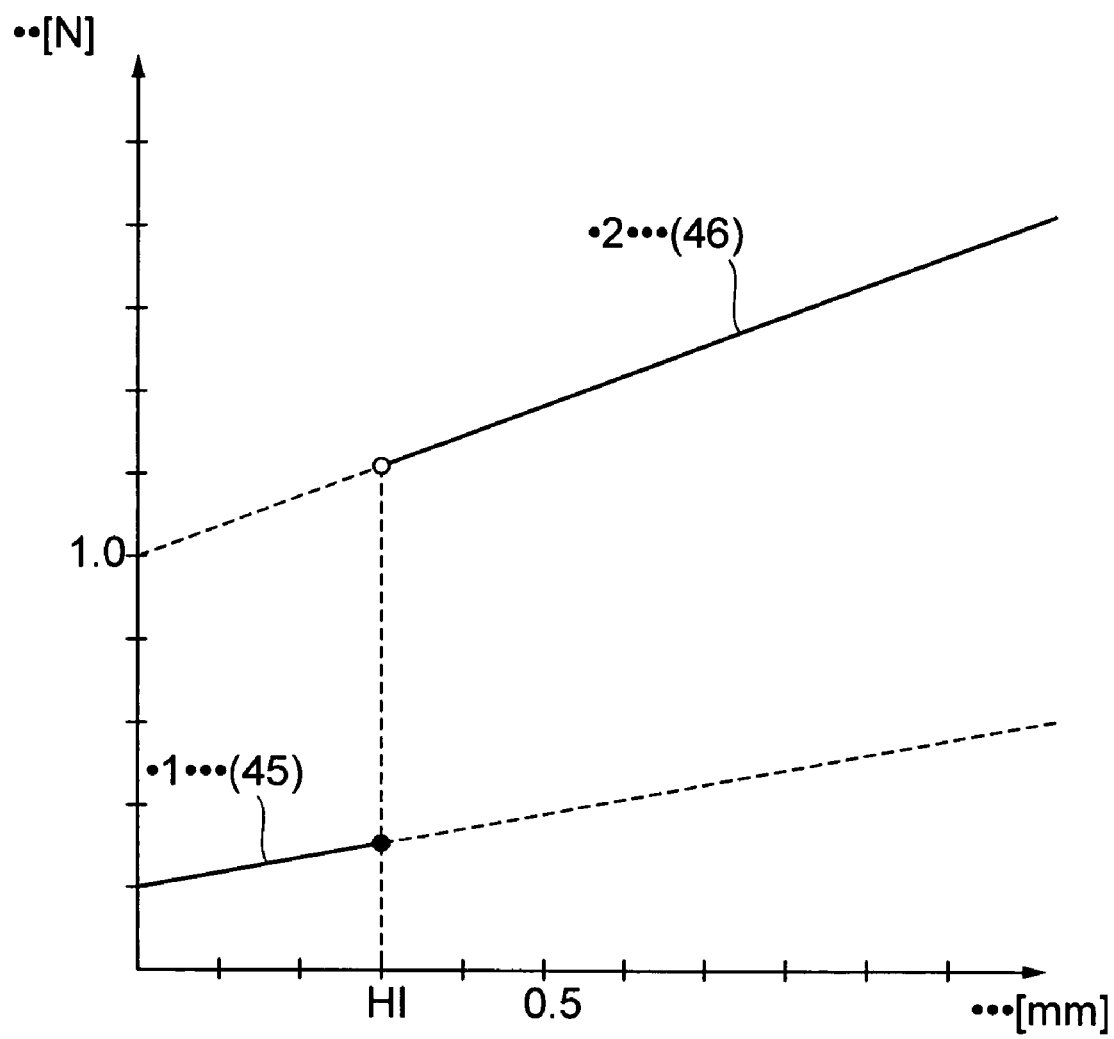
FIG. 6 is a graph showing the relationship between document thickness and pressure produced by the first and second springs of a pressure-generating mechanism in a scanner according to the present invention.

Setting the pressure to be applied by the first spring 45 and from the pressure to be applied by the second springs 46 is hereafter described with reference to FIG. 6. FIG. 6 is a graph showing the relationship between the pressure produced by first spring 45 and second springs 46, respectively, and the document thickness.

In the example shown in FIG. 6 the allowed stroke H1 (threshold value) is set to 0.3 mm, for example, and the pressure asserted toward the sensor 41 varies according to the characteristics of the first spring 45 while the document thickness is no more than this distance. When the document thickness exceeds this allowed stroke H1, the pressure acting in the direction of the sensor 41 varies according to the characteristics of the second springs 46.

As will be understood from FIG. 6, the spring constant of the first spring 45 and the spring constant of the second springs 46 can be set according to the desired pressure to be produced by the corresponding springs. This makes it possible to provide two optimal pressure ranges according to the document thickness, and use the maximum allowed stroke H1 to desirably set the threshold thickness at which the pressure changes from one range to the other.

More specifically, the spring producing pressure toward the scanning surface 41a can be easily changed depending on whether the document thickness is inside or outside the allowed stroke H1. In addition, the spring constants of the first spring 45 and that of the second springs 46 can differ greatly. As a result, when there is a significant difference in the thickness and quality of a particular thin original PA and a particular thick original PB, correspondingly greatly differing pressures can be easily applied to the originals, and both thin and thick originals PA, PB can be held tightly to the scanning surface 41a for scanning with good results.

A scanner 100 according to the first embodiment can therefore scan thermal paper and other such thin originals PA with weak force appropriate for a thin original, and can scan driver's licenses and other such thick originals PB with greater pressure appropriate for a thick original.

Furthermore, simply inserting an original into a scanner 100 according to the first embodiment automatically sets the pressure appropriate for the original without requiring particular operator intervention, and scanning errors, original feed errors, and other problems are thus eliminated.

This scanner 100 can also be used in business machines. One such business machine uses this scanner 100 to scan both checks and personal identifications, such as driver's licenses, that are thicker than a check and can be used to verify the identify of the person using the check.

In this application the business machine uses the scanner 100 to read a check as the thin original PA noted above, and a driver's license or other identification card containing information used to verify the person using the check as the thick original PB. By using the scanner 100 described above in such business machine, both the thin original PA and thick original PB can be scanned and information captured without changing any settings of the scanner 100, and the captured image data can be sent to an external authentication server to verify that the person presenting the check is authorized to use it.

Furthermore, while a torsion spring may be used as the first spring 45 and compression springs may be used for the second springs 46; the invention is not limited to this and any appropriate type of spring and number of springs or other elastic bodies could be used instead.

Furthermore, the first embodiment described with reference to FIG. 2 to FIG. 6 has two pressure settings, that is, using two types of springs and one threshold value H1, but the invention is not limited to this. More particularly, there could be three or more types of elastic body, e.g. springs, and multiple allowable ranges of movement (H1, H2, and so forth). This could be easily achieved by providing a cascade arrangement of movable guides, i.e., a movable guide and a recess housing the movable guide as described above, and a second movable guide as the member in which this recess is provided with the second movable guide housed in a second recess. Alternatively, the bottom of the recess 81 supporting the second springs in FIG. 4 and FIG. 5 could be made movable with this movable bottom supported by a third spring (elastic body).

The pressure-generating mechanism of the first embodiment has been described with the pressure rollers 42 moving in the pressure-applying direction (vertically in the figures) due to the elastic force applied thereto, but it is only necessary in the present invention for relative pressure to be applied to the original. For example, the sensor 41 could be the movable part and the support structure could be changed to produce varying levels of pressure on the sensor 41 instead of on the rollers as described above.

The first embodiment of the invention has also been described as scanning while transporting the original past the scanning surface. The invention is not to be construed as limited to such arrangement and can be applied to a scanner that does not transport the original during scanning.

Second Embodiment

Another embodiment of a scanner according to the present invention is described hereafter with reference to FIG. 7 to FIG. 14.

Figure 7:
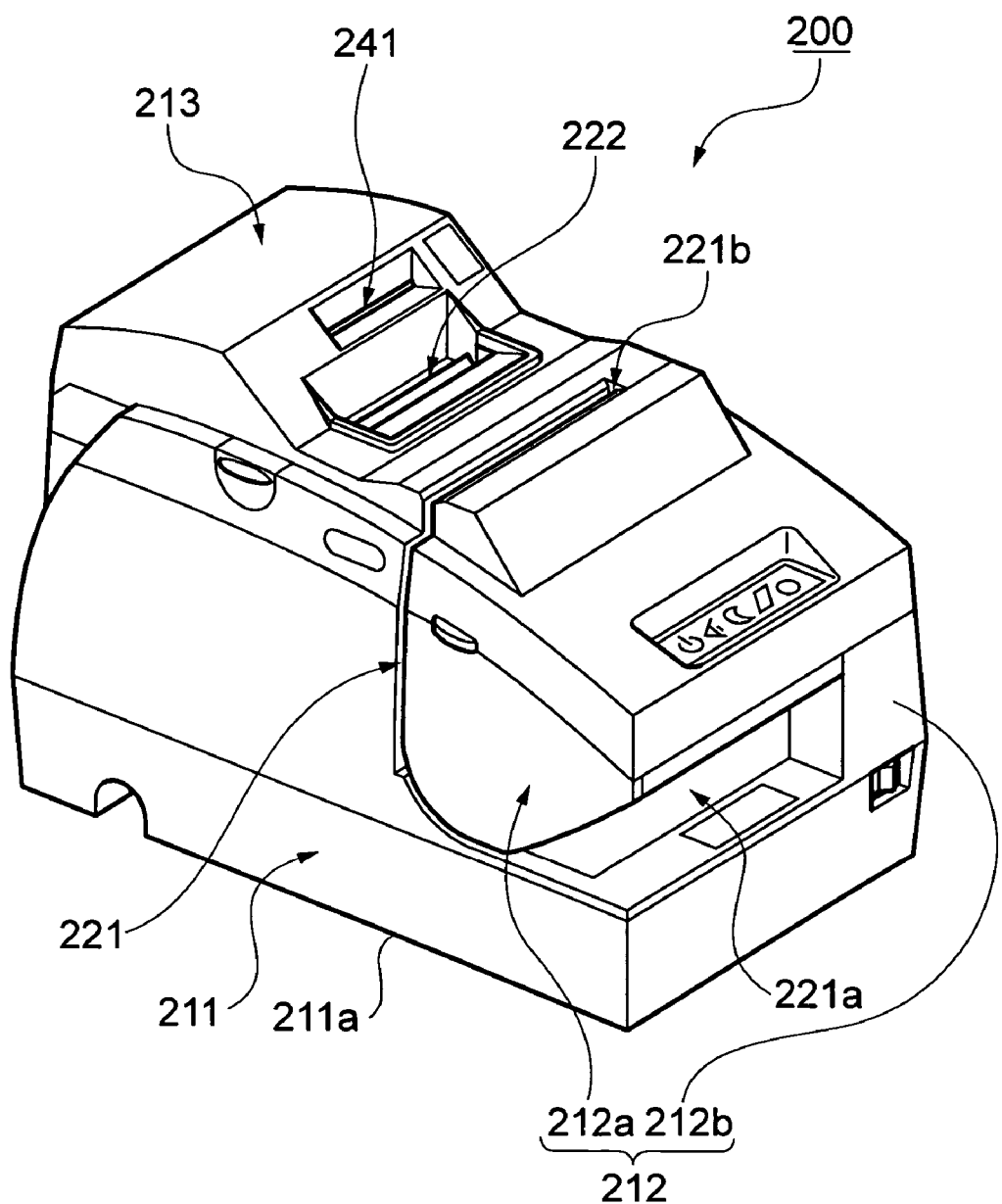
FIG. 7 is a perspective view showing a business machine incorporating a scanner according to a second embodiment of the present invention.
Figure 8:
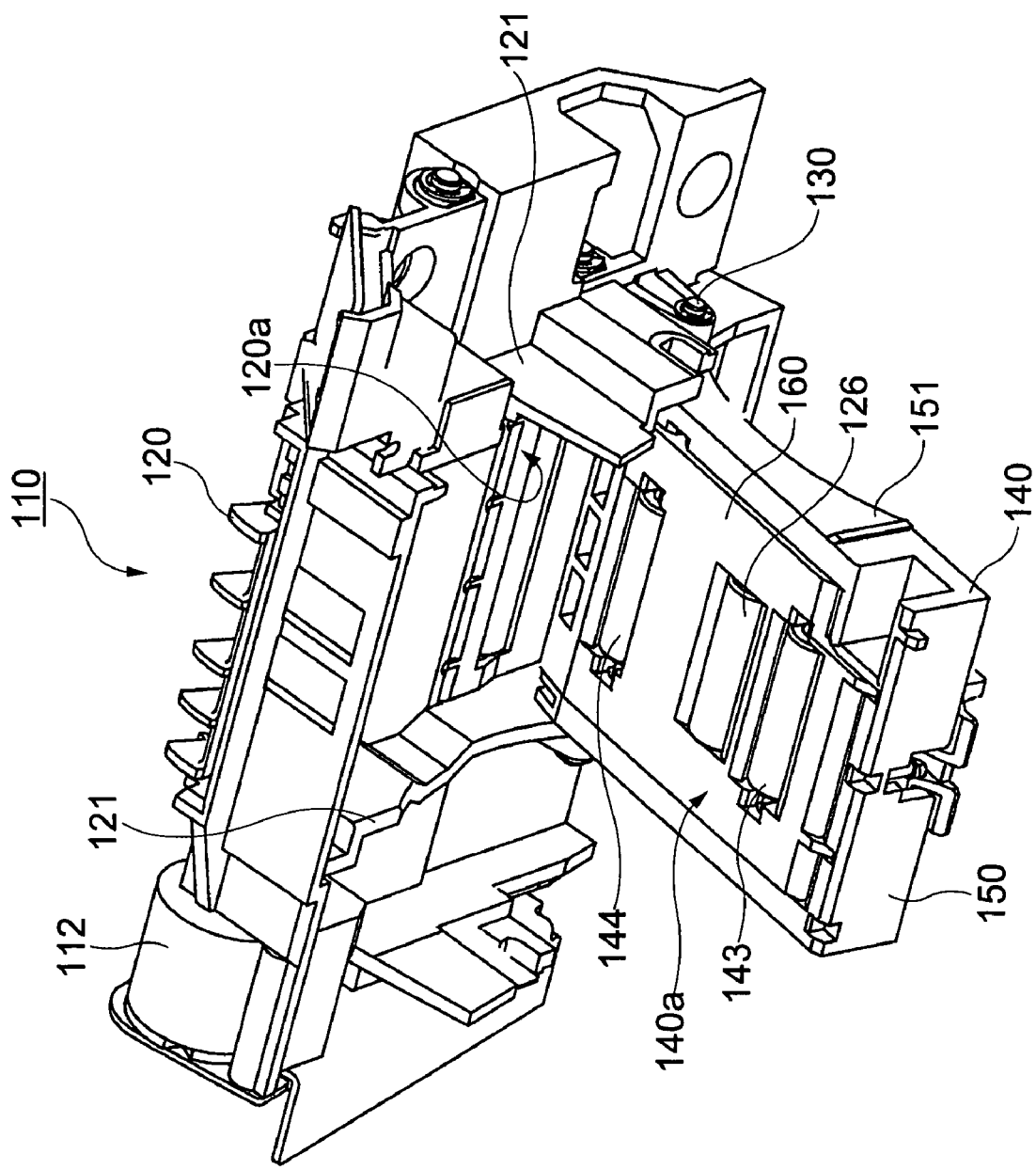
FIG. 8 is a perspective view showing the scanner according to the second embodiment.

FIG. 7 is a perspective view showing a business machine 200 equipped with a scanner 110 of FIG. 8 according to a second embodiment of the present invention.

This business machine 200 is a multiple function printer equipped with a scanner, and can print on both roll paper, not shown, and slip paper, not shown, and can, furthermore, scan and capture information from both slip forms and cards.

This business machine 200 has an integrally formed bottom housing part 211, a front housing part 212, and a top cover unit 213. The bottom housing part 211 holds a roll of paper, not shown, and has a printing mechanism for printing on roll paper drawn off this roll. The front housing part 212 is disposed at the front of bottom housing part 211 and has a slip paper feed path 221 for transporting slips between the front housing part 212 and bottom housing part 211. The top cover unit 213 is mounted so as to cover the top side of the bottom housing part 211, and houses a scanner 110 for scanning image information on an inserted card or other medium.

The front housing part 212 has a front cover 212a separated from the bottom housing part 211 by slip paper feed path 221, and a front side part 212b supporting the front cover 212a in a cantilevered manner. As shown in FIG. 7, slips are inserted into the slip paper feed path 221 from a slip insertion opening 221a providing access to a gap between the bottom housing part 211 and the front cover 212a of the front housing part 212 at the front of the business machine 200. Slips are printed and scanned as they are carried through the slip paper feed path 221 and then ejected from slip exit 221b.

Roll paper is printed inside the bottom housing part 211 and ejected from a roll paper exit 222 at the top of the bottom housing part 211.

A card insertion opening 241 for inserting a card into the scanner 110 is provided at the front of the top cover unit 213. A card inserted into the scanner 110 from this card insertion opening 241 is transported into the scanner 110 and then scanned while being fed in reverse until it is ejected from card insertion opening 241.

The scanner 110 according to this second embodiment holds both credit cards and similarly thick cards CA and business cards and similarly relatively thin cards CB with respectively appropriate pressure so that both types of card can be appropriately scanned. Thin paper, such as the roll paper that is printed and then cut, can also be scanned, and such paper documents are also included in the term "thin card CB" as referred to below. Note, further, that the term "card C" is used where no distinction is being made between a thick card CA and a thin card CB.

Figure 9:
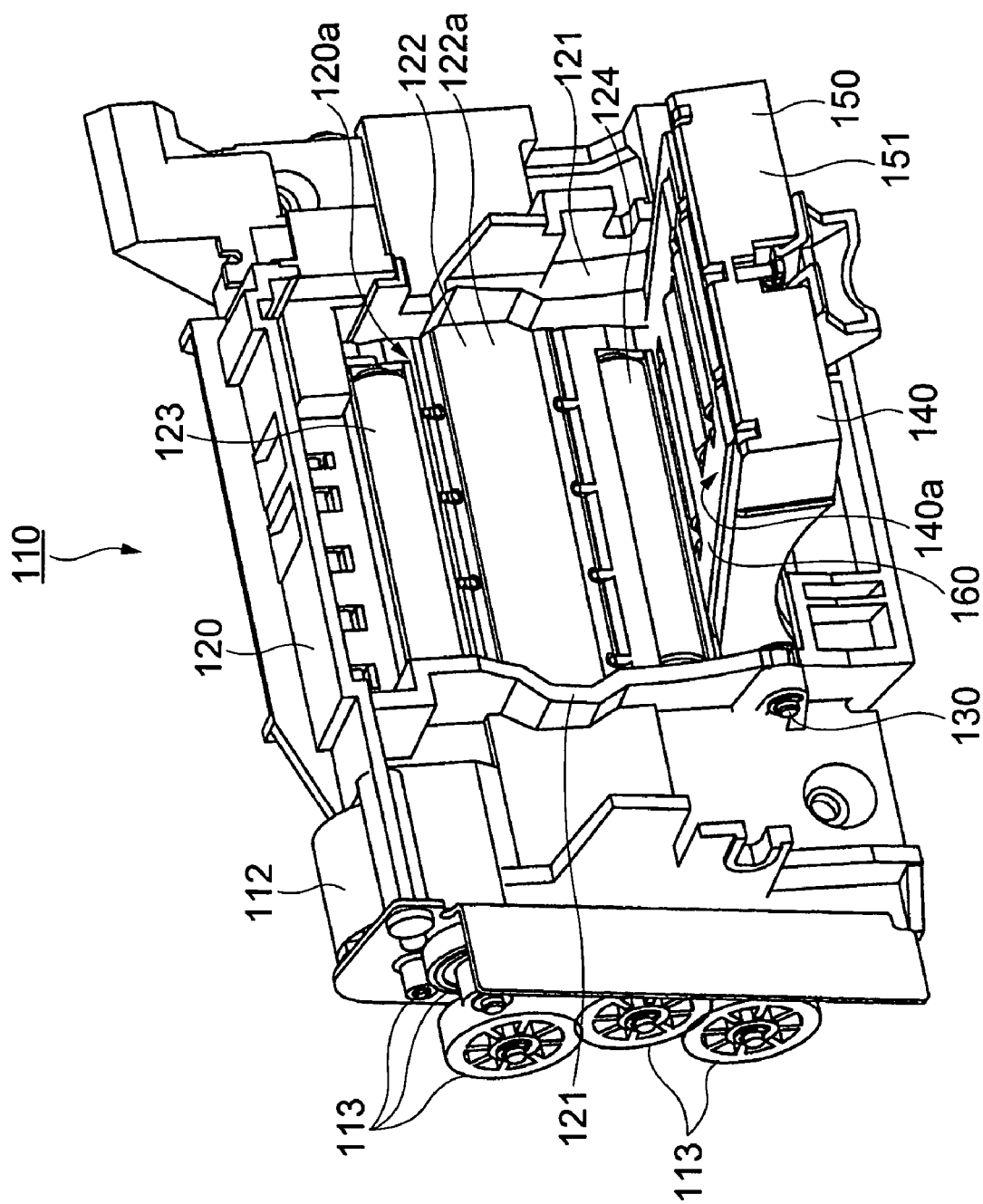
FIG. 9 is another perspective view of the second embodiment.
Figure 10:
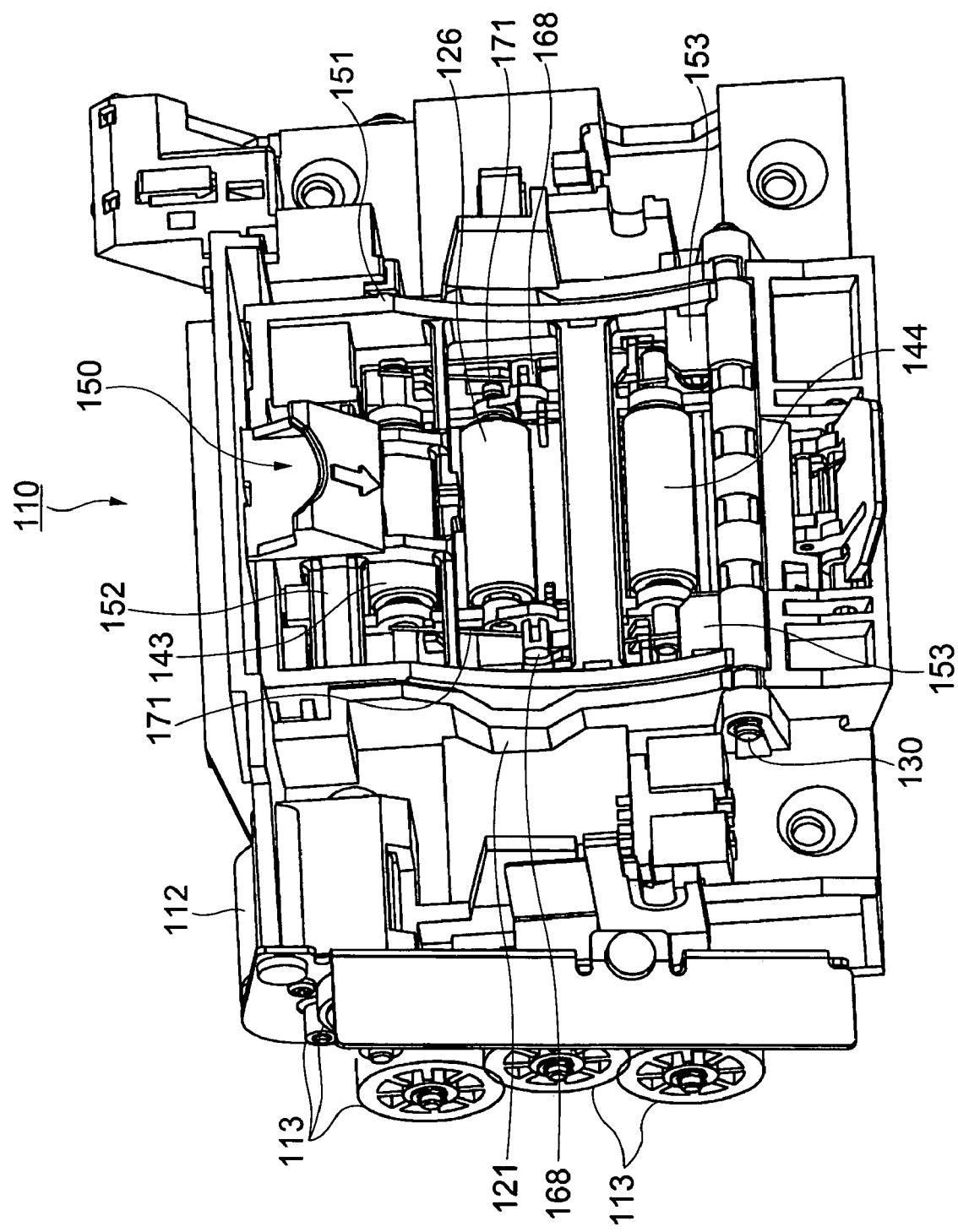
FIG. 10 is still another perspective view of the second embodiment.
Figure 11:
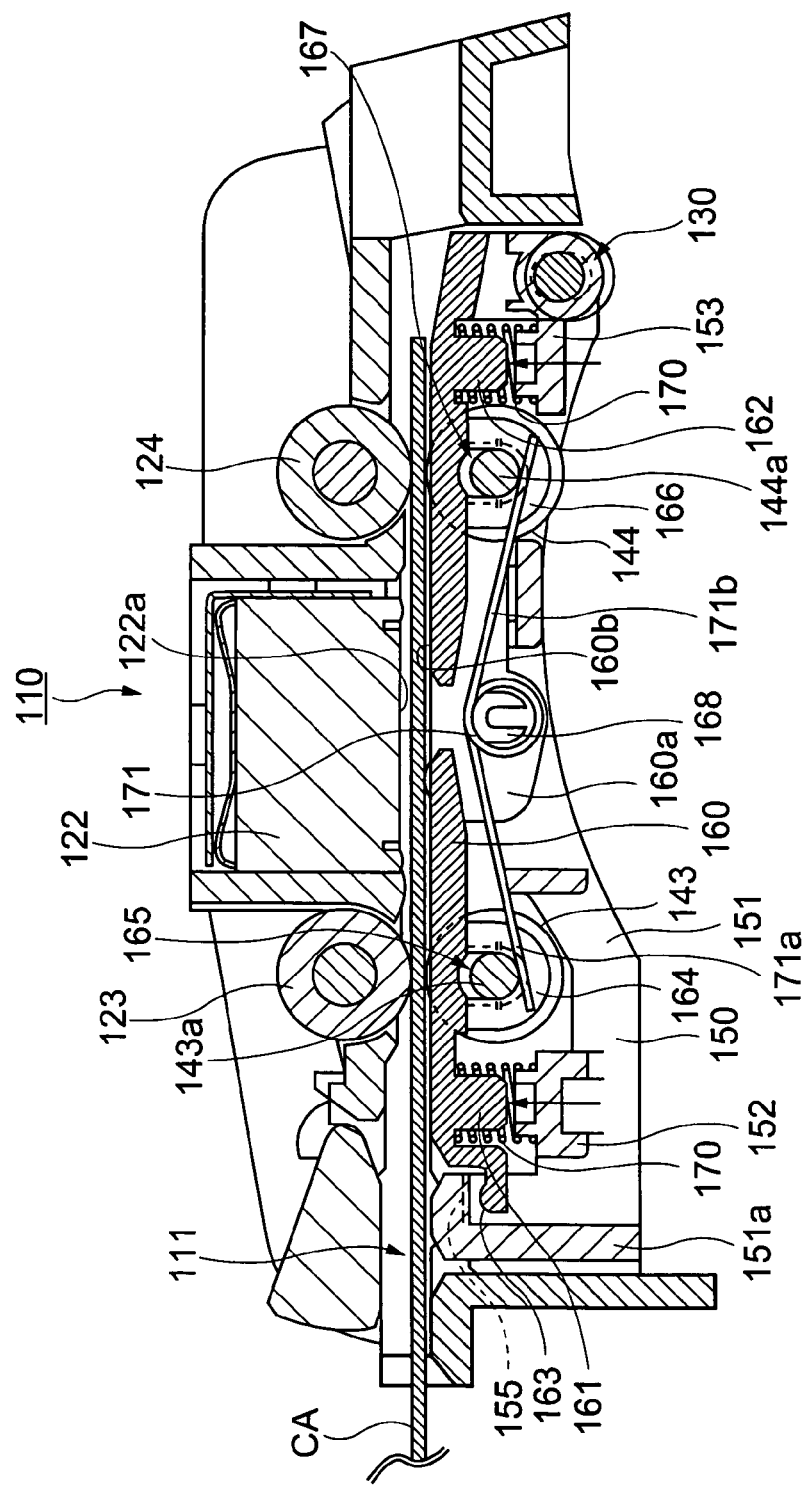
FIG. 11 is a sectional view of the second embodiment illustrating a thick card being inserted into the scanner.
Figure 12:
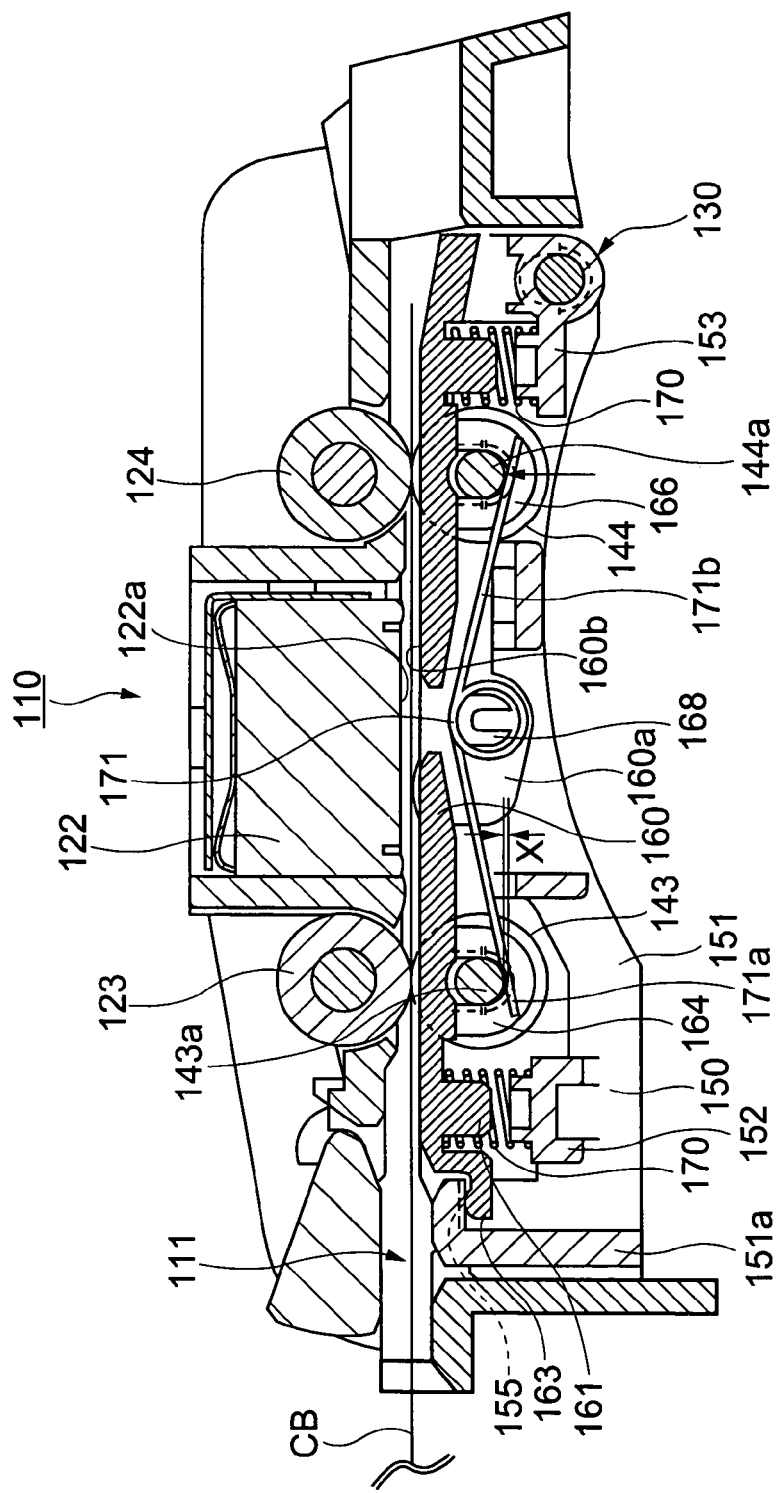
FIG. 12 is a sectional view of the second embodiment illustrating a thin card being inserted into the scanner.

FIG. 8, FIG. 9, and FIG. 10 are perspective views of the scanner 110 according to the second embodiment, FIG. 11 is a sectional view showing a thick card CA being inserted into the scanner 110, and FIG. 12 is a sectional view showing a thin card CB being inserted into the scanner 110.

As shown in FIG. 8 and FIG. 9, the scanner 110 has a main unit 120 and a cover unit 140. The bottom of the main unit 120 forms an upper card guide surface 120a. The top of cover unit 140 forms a lower card guide surface 140a, which is mounted to two side walls 121 formed on the bottom of the main unit 120.

As shown in FIG. 9, a contact image sensor 122 for scanning an image of an inserted card is disposed along the upper card guide surface 120a. The card C being scanned is pressed to the scanning surface 122a (glass surface) of the sensor 122 via a pressure roller 126 as shown in FIG. 10 disposed on the cover unit 140 so that the sensor 122 scans an image of the card C with the card C held firmly against the scanning surface 122a.

A first drive roller 123 and a second drive roller 124 are disposed respectively on the upstream and downstream sides of the sensor 122 in the card transportation direction. The first drive roller 123 and second drive roller 124 are driven in forward or reverse direction by the rotary power of a motor 112 transferred through multiple power transfer gears 113 linked so as to rotate together. The first drive roller 123 and second drive roller 124 and a respectively opposing first driven roller 143 and second driven roller 144 transport the card C through the card feed path 111 (see FIG. 11 and FIG. 12). A card C inserted into the scanner 110 can be transported bidirectionally along the card feed path according to whether the first drive roller 123 and second drive roller 124 are driven forward or in reverse.

At its rear end the cover unit 140 is pivotally mounted by means of a hinge 130 on the side walls 121 of the main unit 120. When the cover unit 140 is closed as shown in FIG. 10, the upper card guide surface 120a of main unit 120 and the lower card guide surface 140a of cover unit 140 are held in substantially parallel juxtaposition, forming the card feed path 111 with a specific gap between the upper card guide surface 120a and lower card guide surface 140a (see FIG. 11 and FIG. 12).

As shown in FIG. 8, FIG. 11, and FIG. 12, the cover unit 140 has a base 150 and a movable guide 160 mounted on the base 150 by means of four coil springs 170 (only two being shown in FIG. 11 and FIG. 12). The lower card guide surface 140a is formed by the top surface of base 150 and the top surface of the movable guide 160.

The base 150 has substantially rectangular side walls 151 joined and reinforced by a support member. The movable guide 160 is installed in the opening surrounded by these side walls 151 so that the movable guide 160 can slide up and down along the walls 151.

Coil springs 170 are elastic bodies urging the movable guide 160 upward (towards the main unit 120 when closed) from the base 150. The coil springs 170 are disposed in the four corner areas of the movable guide 160. One end of each coil spring 170 shown in FIG. 11 and FIG. 12 is positioned on a spring mount 152, 153 formed integrally with the walls 151 of the base 150, and the other end of each spring is set on a spring mount 161, 162 projecting from the back side of the movable guide 160.

The front side wall 151a of base 150 has a substantially L-shaped configuration with the top end part 155 thereof disposed along lower card guide surface 140a. When the movable guide 160 is pushed by the coil springs 170, the front end part 163 of the movable guide 160 contacts the top end part 155, which thus limits the upward movement of the movable guide 160. Although not shown in the drawings, a similar structure is provided at the rear side wall. In other words, the top end part 155 of front side wall 151a and a corresponding part of the rear side wall function as a stopper determining the upper limit of the stroke of movable guide 160.

In FIG. 12, coil springs 170 are compressed when the front end part 163 of movable guide 160 contacts the top end part 155 of base 150, and thus urge the movable guide 160 to the base 150 (top end part 155) with a specific spring force.

A first roller support 164 for positioning the first driven roller 143 opposite the first drive roller 123, and a second roller support 166 for positioning the second driven roller 144 opposite the second drive roller 124, are also disposed to the side walls 160a of the movable guide 160.

Figure 13:
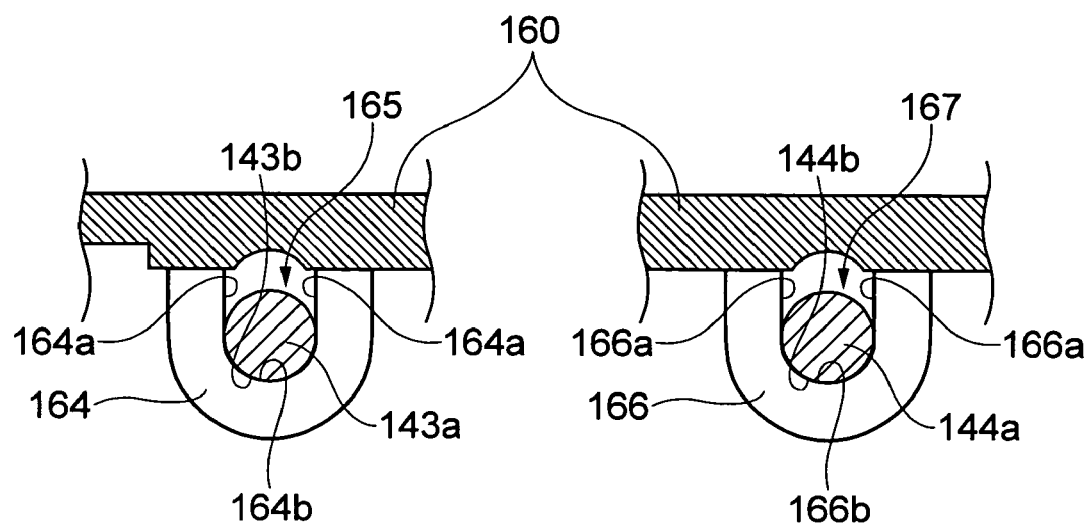
FIG. 13 (a-b) are enlarged partial sectional views showing the relationship of the first and second drive roller shaft and shaft support holes of FIG. 11 when a thick card is inserted in the scanner.
Figure 14:
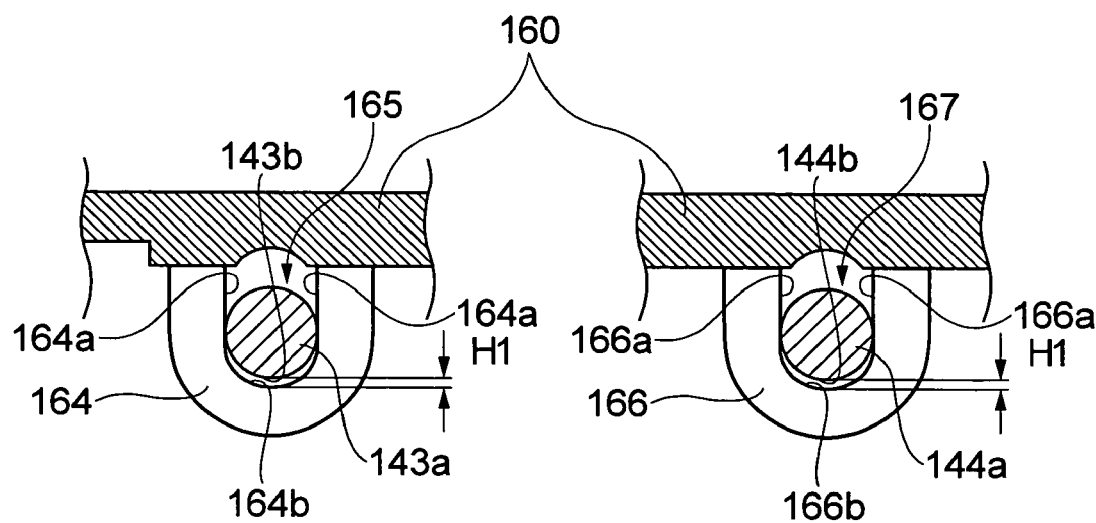
FIG. 14 (a-b) are enlarged partial sectional views showing the relationship of the first and second drive roller shaft and shaft support holes of FIG. 12 without a card inserted in the scanner.
Figure 15:
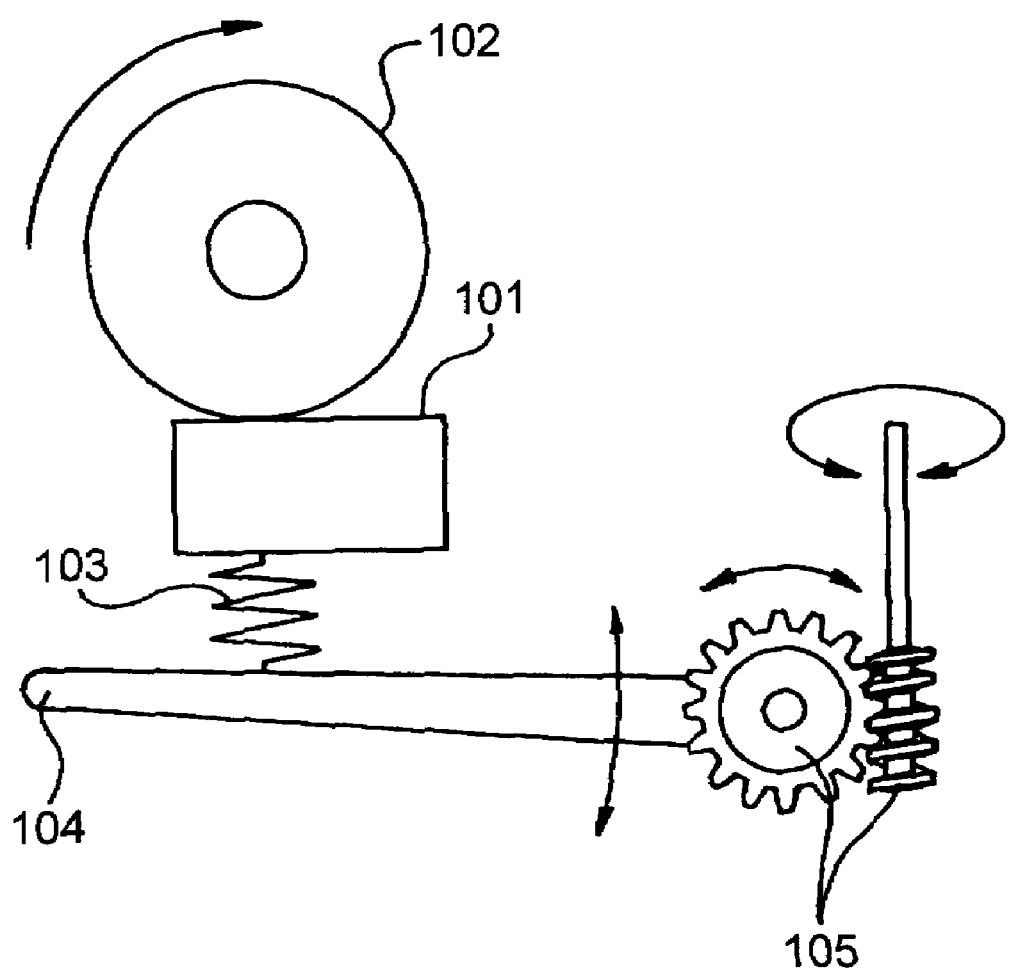
FIG. 15 shows the configuration of a pressure-generating mechanism in a conventional scanner.

As shown in FIG. 13 (a-b) and FIG. 14 (a-b), the shaft 143a of the first driven roller 143 is inserted into a first shaft support hole 165 formed in the first roller support 164. This first shaft support hole 165 has an elliptical geometry with an elongated axis in the vertical direction as shown in the figures. The shaft 143a is positioned by both side walls 164a of the first shaft support hole 165 so that there is virtually no play side to side (i.e., the card feed direction) whereas the shaft 143a can move freely within a defined range in the vertical direction, that is, perpendicular to the card feed direction. More specifically, when nothing is being fed through the card feed path 111, the distance between the bottom 143b of the shaft 143a of first driven roller 143 and the bottom 164b of the first shaft support hole 165 is height H1 as shown in FIG. 14(a).

The shaft 144a of the second driven roller 144 is likewise inserted into a second shaft support hole 167 formed in the second roller support 166 as shown in FIG. 13 and FIG. 14. This second shaft support hole 167 also has an elliptical geometry with an elongated axis in the vertical direction as shown in the figures. The shaft 144a is positioned by both side walls 166a of the second shaft support hole 167 so that there is virtually no play side to side (i.e., the card feed direction) and the shaft can move freely within a defined range in the vertical direction, that is, perpendicular to the card feed direction. More specifically, when nothing is being fed through the card feed path 111, the distance between the bottom 144b of the shaft 144a of second driven roller 144 and the bottom 166b of the second shaft support hole 167 is the same height H1 as that between the bottom 143b of shaft 143a of first driven roller 143 and the bottom 164b of first shaft support hole 165 as shown in FIG. 14(b).

The first driven roller 143 and second driven roller 144 are positioned so that their peripheral surface is always above the top surface 160b of the movable guide 160 within the range of vertical movement inside the first shaft support hole 165 and second shaft support hole 167.

A torsion spring 171 is wound around a spring mount 168 formed on the side of the side walls 160a of movable guide 160. One end 171a of this torsion spring 171 functions as a first working arm contacting the shaft 143a of first driven roller 143, and urges the shaft 143a toward the first drive roller 123. The other end 171b of the torsion spring 171 functions as a second working arm contacting the shaft 144a of second driven roller 144, and urges the shaft 144a toward the second drive roller 124. The spring load of this torsion spring 171 is set lower than the spring load of coil springs 170.

Though not shown in FIG. 11 and FIG. 12, the pressure roller 126 is also urged toward the sensor 122 by a spring member mounted to the movable guide 160. The relationship between this pressure roller 126 and movable guide 160 is the same as that of the pressure member 2 and movable guide 20 shown in FIG. 1, and the operation and action of this pressure roller 126 are also the same as the operation and action of the pressure member 2 shown in FIG. 1.

When a thin card CB of thickness h (h<H1) is fed through card feed path 111 in this second embodiment, the bottom 143b of shaft 143a of first driven roller 143 and the bottom 164b of first shaft support hole 165 do not touch, and the bottom 144b of shaft 144a of second driven roller 144 and the bottom 166b of second shaft support hole 167 do not touch, as shown in FIG. 12. This corresponds to the arrangement of FIG. 14(a) and 14(b) since H1>h. Only the force produced by torsion spring 171 is therefore applied to the first driven roller 143 and second driven roller 144 at this time.

The spring force of torsion spring 171 that presses the driven rollers 143 and 144 against the driven rollers 123 and 124 causes a downwardly directed reaction force acting on the movable guide 160.

The coil springs 170 pushing the movable guide 160 up are chosen to produce a spring load preventing the coil springs 170 from being deflected by this reaction force so that the coil springs 170 hold the front end part 163 of movable guide 160 in contact with the top end part 155 of front side wall 151a, and the spring force of coil springs 170 does not affect the first driven roller 143 and second driven roller 144.

On the other hand, as shown in FIG. 11 and FIG. 13 (a-b), when a thick card CA with a thickness h>=H1 is transported through the card feed path 111, the bottom 143b of shaft 143a of first driven roller 143 contacts and pushes on the bottom 164b of first shaft support hole 165, and the bottom 144b of shaft 144a of second driven roller 144 contacts and pushes down on the bottom 166b of second shaft support hole 167. This pushes the movable guide 160 down, overcoming the upward force of the coil springs 170, and front end part 163 of movable guide 160 separates from top end part 155 of front side wall 151a.

As a result, the force of coil springs 170 acts on first driven roller 143 and second driven roller 144. More specifically, the pressure applied to card C changes suddenly and nonlinearly at thickness h=H1, and the pressure on first driven roller 143 and second driven roller 144 changes abruptly and the difference can vary over a wide range.

The scanner 110 of this second embodiment can thus change from the pressure produced by torsion spring 171 to the pressure produced by coil springs 170 according to the thickness of the inserted document. The pressure applied when transporting a thick card CA and the pressure applied when transporting a thin card CB can thus be changed non-linearly using two spring means rather than using only the linearly changing pressure of just one spring, and both thin cards and thick cards of greatly differing thickness can be transported using pressure appropriate for the respective card thickness. More specifically, transportation jams, marring, and soiling of the document as a result of applying too much pressure to a thin card (document) is prevented. Thick cards (documents) can also be transported reliably without the card slipping as a result of insufficient pressure being applied to the thick card.

Furthermore, when the rollers grab the end of a thick card or release the end of a thick card, the force of a weak spring acts on the card rather than the force of a spring with a high spring constant. Therefore, the change in the transportation load when the edge of the card is grabbed and when the edge is released can be reduced compared with a conventional configuration having only one spring, and disruption of both the document feed pitch and scanning can be prevented.

It will be understood that the description of the second embodiment concentrated on the structure provided to apply document thickness dependent pressure not only to the scanned original where it contacts the scanning surface but also where it is pinched between a drive roller and driven roller. The structure for applying such document thickness dependent pressure on the pressure roller 126 may be the same or similar to that described in the context of the first embodiment.

The invention claimed is:

1. An image scanning apparatus comprising:
   an image sensor for reading image information from a document while the image sensor is held in contact with the document, and
   a pressure-generating mechanism for pressing the document against the image sensor wherein said pressure generating mechanism comprises multiple elastic bodies of different spring constants in an arrangement such that one or more elastic bodies provide an applied force to urge the document against the image sensor when the document is below a predetermined thickness and another one or more elastic bodies provide an applied force to urge the document against the image sensor when the document is at or above a predetermined thickness.

2. The apparatus according to claim 1, wherein the elastic bodies include:
   a first elastic body having a first spring constant, the first elastic body being arranged to urge the document against the image sensor when the thickness of the document is within a first range, and
   a second elastic body having a second spring constant that is greater than the first spring constant, the second elastic body being arranged to urge the document against the image sensor when the thickness of the document is in a second range equal to or greater than the maximum thickness of the first range.

3. The apparatus according to claim 2, wherein the pressure-generating mechanism comprises:
   a pressure member for pressing the document towards the image sensor,
   a movable guide holding the pressure member movably in the document thickness direction, the first elastic body being arranged to act between the pressure member and the movable guide, and
   a fixed guide movably supporting the movable guide with the pressure member in the document thickness direction, the second elastic body being arranged to act between the movable guide and the fixed guide.

4. The apparatus according to claim 3,
   wherein the document is urged by the first elastic body when the movement of the pressure member relative to the movable guide is no more than a predefined value, and
   wherein the document is urged by the second elastic body when the movement of the pressure member relative to the movable guide exceeds the predefined value.

5. The apparatus according to claim 3 wherein the pressure member is a roller for holding the document substantially parallel to the scanning surface of the image sensor.

6. The apparatus according to claim 4, wherein the pressure member is a roller for holding the document substantially parallel to the scanning surface of the image sensor.

7. The apparatus according to claim 3, further comprising a document guide cover disposed opposite the image sensor, wherein the pressure-generating mechanism is disposed on the document guide cover.

8. The apparatus according to claim 3, further comprising a document feed mechanism;
   wherein the document feed mechanism comprises:
   a drive roller for transporting the document,
   a driven roller arranged opposite the drive roller, and the elastic bodies for the document feed mechanism represent multiple elastic elements each for pressing the driven roller against the drive roller with a respective one of different elastic forces,
   wherein the movable guide is responsive to the thickness of the document such that the first elastic body provides an applied force to urge the document against the image sensor when the document is below a predetermined thickness and the second elastic body provides an applied force to urge the document against the image sensor when the document is at or above a predetermined thickness.

9. The apparatus according to claim 8, wherein the multiple elastic elements of the document feed mechanism include:
   a third elastic body having a third spring constant, the third elastic body being arranged to urge the document via the driven roller against the drive roller when the document thickness is within a third range, and
   a fourth elastic body having a fourth spring constant that is greater than the third spring constant, the fourth elastic body being arranged to urge the document via the driven roller against the drive roller when the document thickness is in a fourth range contiguous to and greater than the third range.

10. The apparatus according to claim 1, further comprising:
    a drive roller for transporting the document and a driven roller disposed opposite the drive roller,
    wherein the pressure-generating mechanism further comprises:
    a pressure member for pressing the document towards the image sensor,
    a movable guide holding the pressure member and the driven roller movably in the document thickness direction,
    a fixed guide movably supporting the movable guide in the document thickness direction with the pressure member and the driven roller,
    a first elastic body arranged to act between the pressure member and the movable guide for urging the document against the image sensor when the document thickness is within a first range,
    a second elastic body arranged to act between the movable guide and the fixed guide for urging the document against the image sensor and urging the document via the driven roller against the drive roller when the document thickness is within a second range contiguous to and greater than the first range, and
    a third elastic body arranged to act between the driven roller and the movable guide for urging the document via the driven roller against the drive roller when the document thickness is within said first range.

11. The apparatus according to claim 10, wherein the pressure member is a roller for holding the document substantially parallel to the scanning surface of the image sensor.

12. The apparatus according to claim 10, further comprising a document guide cover disposed opposite the image sensor, wherein the pressure-generating mechanism is disposed on the document guide cover.

13. A business machine adapted to read a check and a personal identification card that is thicker than the check comprising image scanning apparatus further comprising:
    an image sensor for reading image information from a document while the image sensor is held in contact with the document, a pressure-generating mechanism for pressing the document against the image sensor wherein said pressure generating mechanism comprises multiple elastic bodies of different spring constants in an arrangement such that one or more elastic bodies provide an applied force to urge the document against the image sensor when the document is below a predetermined thickness and another one or more elastic bodies provide an applied force to urge the document against the image sensor when the document is at or above a predetermined thickness.

14. A method for reading image information from a document using an image sensor having a scanning surface and a pressure generating mechanism having a multiple number of elastic elements with different spring constants for generating a force to press the document against the scanning surface comprising the steps of selecting different elastic elements in accordance with the thickness of the document such that the force applied to press the document automatically changes with the thickness of the document.

* * * * *